Aug. 16, 1966  A. WOGERBAUER  3,266,778
ESPALIER STAKES
Filed April 23, 1963  3 Sheets-Sheet 1
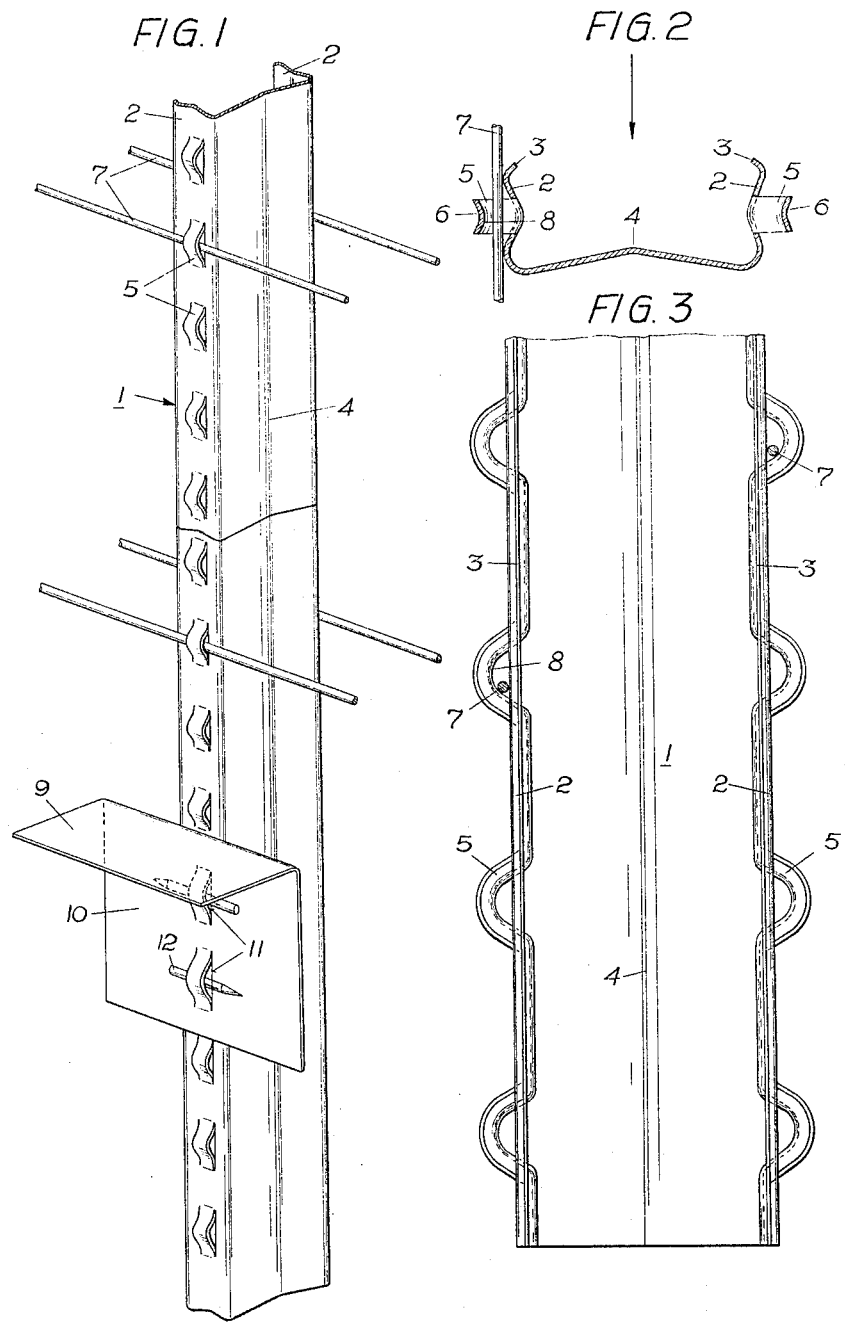
INVENTOR
ALFRED WOGERBAUER
BY
HIS ATTORNEYS

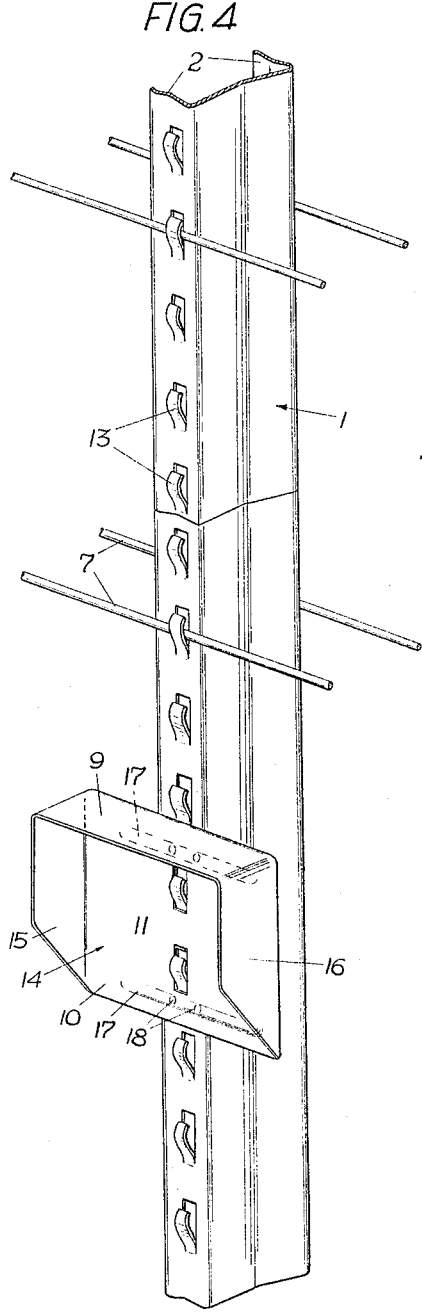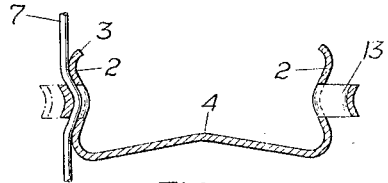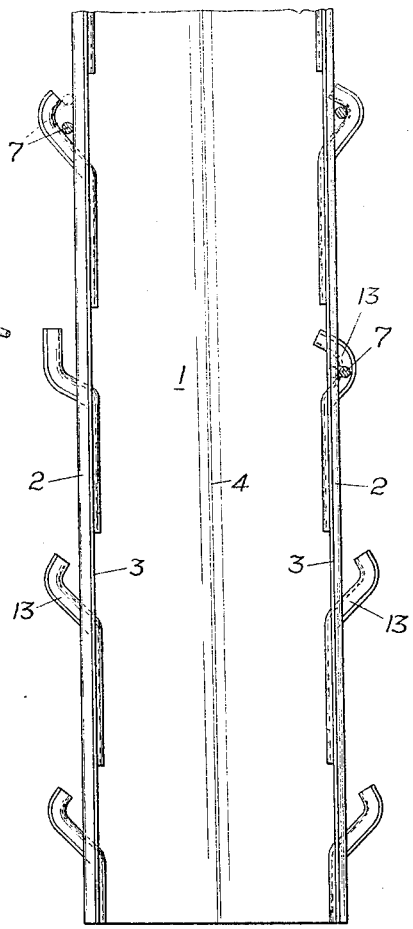

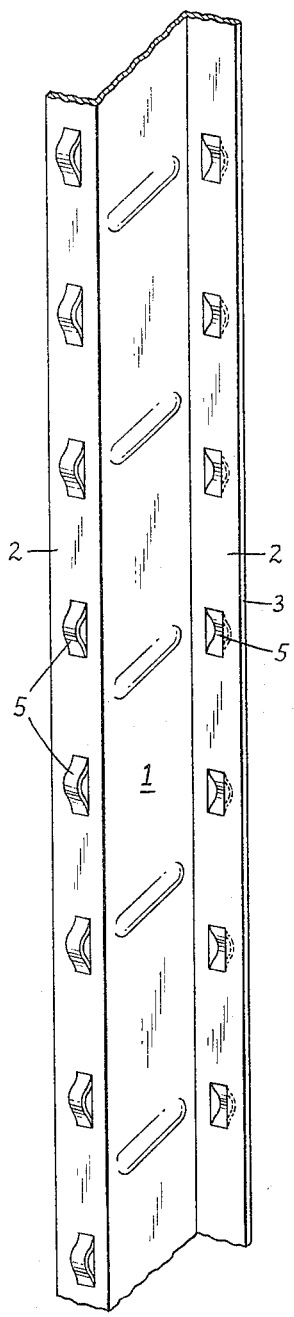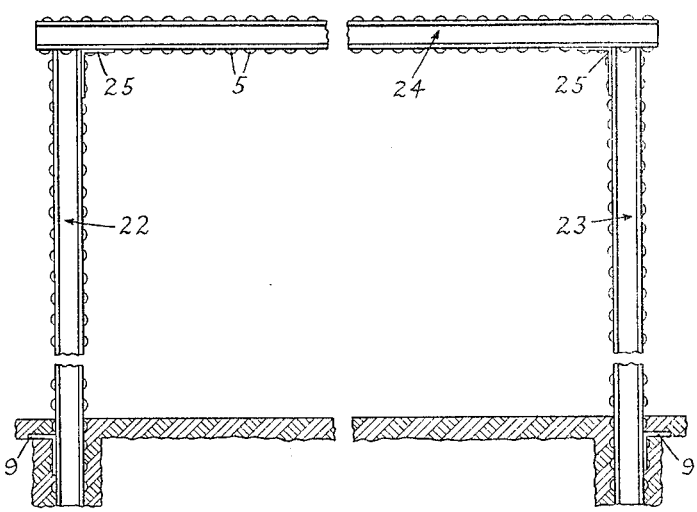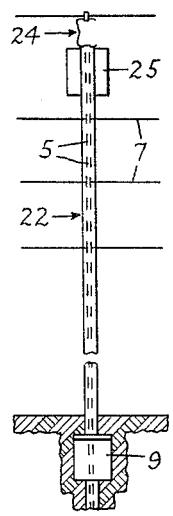

United States Patent Office 3,266,778
Patented August 16, 1966

3,266,778
ESPALIER STAKES
Alfred Wögerbauer, Linz (Danube), Austria, assignor to Vereinigte Osterreichische Eisen- und Stahlwerke Aktiengesellschaft, Linz, Austria, a company of Austria
Filed Apr. 23, 1963, Ser. No. 274,974
Claims priority, application Austria, Apr. 25, 1962, A 3,398/62
2 Claims. (Cl. 256—47)

This invention relates to an espalier stake for high-growing fruit, vegetable and particularly vine plants.

The stakes previously employed for training plants consisted either of wood or concrete, in some cases also of steel sections. Stakes of wood have a number of disadvantages. They rot at the transition between the soil and the air and do not even nearly reach the age of the vines so that they must be renewed several times during the life of the vines. This work is complicated and causes damage to the culture. The espalier wire is fixed with clamps to the wooden stakes. This causes damage to the wire by missing hammer blows, as well as a frequent loss of the staples, and an uneven and poor arrangement of the staples. In some cases the staples fall out before the stakes are renewed. This may cause damage to the plants. Concrete stakes have the disadvantage of being heavy. They cannot be driven into the soil but must be inserted into a dug hole. This is time-consuming and involves a lot of work. The previously used stakes of steel have the disadvantage that particularly complicated holders for the wires must be secured to them. For this reason, such stakes are very costly.

Supports for agricultural purposes are also known which consist of a metal rail having a channel-like profile, slots being provided along the length of the rail at the base of the channel section, in which slots a hooked thorn of an angle-shaped holder can be inserted. When these members are assembled, the angular arm of such a holder projects from the metal rail in inclined relation. By combining a plurality of such supports, frames for drying grass or the like can be formed. This type of supports is not suitable for use as espalier stakes, i.e. for fastening espalier wires.

The object of the invention is to avoid the disadvantages and difficulties involved in the use of the known stakes and to provide a durable stake of sheet iron or steel. The stake is required to attain, e.g. the life of the plants of a vineyard so that the stakes need not be renewed during the lifetime of these plants. Furthermore, the invention contemplates the formation of three-dimensional espaliers, such as bowers, for vineyards.

The object of the invention thus is an espalier stake, particularly for high-growing fruit, vegetable and vine plants, consisting of an open sheet metal section, such as a channel or Z-section, having free flanges which may have a wave-shaped profile in the longitudinal direction, holding means for wires being provided, which is characterized in that the holding means are formed out of the wall portions of the flanges to form straps, loops, claws or the like through which the wires can be passed.

The holding means formed out of the flanges suitably have a trough-shaped profile with a convex curvature facing the surface of the flanges so that the wire passed through between the wave-shaped profile of the flanges and the holding means is in contact only with convex curvatures (wave crests).

The free flange ends are preferably turned in towards the plane of symmetry through the longitudinal axis of the section.

Vertically adjustable, angle-shaped holding plates may be provided for anchoring the stake in the soil.

Espalier stakes according to the invention may be made to advantage by the following method.

The starting material is a coil or flat steel strip. In a first forming stage the strip is given a wave-shaped profile in the longitudinal direction in both marginal zones, preferably on a shape rolling machine. In the zones having a wave-shaped profile, parallel cuts can then be formed in the strip at predetermined points of its length, and the portion defined by the cuts may be forced out of the plane of the strip to form a loop or claw. The profiled marginal zones formed with loops are then turned up so that an open section, such as a channel or Z-section, is obtained, which is cut into lengths corresponding to the desired length of the stake.

Alternatively, the strip which has been given a longitudinal wave profile in both marginal zones in the first forming stage may be shaped first so that an open section, such as a channel or Z-section is obtained in which the zones having a wave-shaped profile form the free flanges, whereafter the flanges are provided at predetermined points with parallel cuts, the portions defined by the cuts are forced out of the plane of the flange to form a loop or claw, and finally the resulting stake section is cut into lengths corresponding to the desired length of the stake.

These and further features of the invention are explained more in detail in the drawing, which illustrates several embodiments shown by way of example. FIG. 1 is a perspective view showing a stake. FIG. 2 is a horizontal sectional view and FIG. 3 is a side elevation showing the stake as viewed in the direction of the arrow in FIG. 2. FIGS. 4, 5 and 6 are corresponding views showing a modified embodiment. FIG. 7 is a perspective view showing a further embodiment of an espalier stake. FIGS. 8 and 9 are a front elevation and a side elevation, respectively, showing a composite structure incorporating a plurality of stakes according to the invention.

In the drawing, 1 designates a stake having substantially the shape of a channel section. The flanges 2 of the stake have a wave-shaped profile in the longitudinal direction and inturned edges 3. To improve the inherent rigidity of the stake, the web of the channel may suitably be provided with a longitudinally extending bead 4. Loops 5 are formed out of the flanges 2 and, as shown in FIG. 2, have a trough-shaped profile 6. When the wire 7 is passed through the loops, the wire contacts only the convexly curved portions (wave crests) 8 so that an injury to the wire or, where coated wires are used, an injury to the coating will reliably be avoided. In FIG. 1, numeral 9 denotes an angled anchor plate. One flange 10 of the plate has longitudinal slots of windows 11, which fit the loops 5 and can be locked with fixed pins 12. The horizontal flange of the plate 9 is intended to lie in the surface layer of the soil; it imparts an adequate stability to the stake and prevents a subsiding of the stake.

In the modified embodiment shown in FIGS. 4 to 6, the loops 5 are replaced by open claws 13, which are formed out of the material of the flanges 2 in the same manner as the loops 5. The claw 13 can be depressed, as shown in FIG. 5, to clamp the wire 7 between the flange 2 and the claw 13. This will result in a compound effect and preclude a longitudinal displacement of the wires.

The holding plate 14 shown in FIG. 4 consists of a sheet metal pressing, which has also angle flanges 9 and 10 with additional lateral stiffeners 15 and 16. The anchor plate again has windows 11. In addition or as an alternative, it may be spot-welded with the aid of pressed beads 17 which cross the longitudinal waves of the flanges. The spot welds are indicated at 18.

In a view which is similar to that of FIG. 1, FIG. 7 shows a stake 1 having substantially the shape of a Z-section. The side flanges 2 again have a wave-shaped profile in the logitudinal direction and inturned edges 3. Just as in the embodiment described with reference to FIG. 1, loops 5 are formed out of the material of the flanges.

FIGS. 8 and 9 are a front elevation and a side elevation, respectively, showing a composite structure consisting of three espalier stakes. Two stakes serve as upright standards 22 and 23 and another stake 24 serves as a horizontal strut. The connection between the upright standards 22, 23 and the strut 24 is effected with angles 25, which are designed like the anchor plates 9 shown in FIGS. 1 and 4. These angles 25 have windows, which fit the loops 5 and are locked by pins or the like. The upright standards are anchored in the soil with anchor plates 9.

The stakes according to the invention are eminently suitable for the cultivation of plants. In vine growing, e.g., there is an increasing trend to cultivate high-growing plants, i.e., to vines trained along wires so as to form walls up to heights of more than two metres. This trend was previously opposed by the costs involved in the use of the known stakes. The stake according to the present invention permits of the introduction on a very large scale and consequently in an essential increase in yield. Conversely, modern fruit growing changes from tall trees to hedges which give also higher yields and facilitate cultivation and harvesting. Espalier stakes according to the present invention are advantageous also for growing vegetables. For instance, the yield of tomatoes can be greatly increased. Finally, the present espalier stake may also be used for building bowers for recreation and for training ornamental plants.

What I claim is:

1. An espalier stake, comprising an elongated member of open cross-section having longitudinally extending spaced apart flanges having a wave-shaped profile in the longitudinal direction of the section providing convexly curved edge portions extending lengthwise of each flange and a lengthwise extending concave valley portion therebetween, wire holding straps integral with said flanges and extending outwardly from the valley portions, each of said straps having a concavo-convex cross-section with the convex surface portion of said straps facing and spaced apart from the concave valley portion of the flange with which it is integral forming a three-zone support devoid of sharp edges for an object passing between a strap and a flange.

2. The stake set forth in claim 1 comprising a holding plate having angularly related plate portions adapted to be attached to the stake, one of said plate portions having longitudinal slots fitting said straps for securing said plate to said stake with the other plate portion extending outwardly from said stake for anchoring the stake in the soil.

References Cited by the Examiner

UNITED STATES PATENTS

| | | | |
|---|---|---|---|
| 380,627 | 4/1888 | Harmon et al. | 189—29 |
| 749,862 | 1/1904 | Hegbom. | |
| 944,342 | 12/1909 | Mattice | 256—58 |
| 963,938 | 7/1910 | Phillips. | |
| 1,174,901 | 3/1916 | Schaible | 47—47 |
| 1,320,253 | 10/1919 | Lutz | 256—49 |
| 1,408,332 | 2/1922 | Zimmerman | 189—29 |
| 1,454,649 | 5/1923 | Murton | 256—47 X |
| 1,639,638 | 8/1927 | Hook | 256—58 |
| 1,934,822 | 11/1933 | Sawyer | 29—155 |
| 2,854,101 | 9/1958 | Carper | 189—23 |

HARRISON R. MOSELEY, *Primary Examiner.*

THEODORE G. CRAVER, REINALDO P. MACHADO, D. L. TAYLOR, *Examiners.*